H. A. SHIELDS.
MACHINE FOR FOLDING TUBULAR KNIT FABRICS.
APPLICATION FILED MAR. 23, 1908.

915,229.

Patented Mar. 16, 1909.
3 SHEETS—SHEET 2.

Witnesses
H. P. Van Antwerp.
Palmer A. Jones.

Inventor
Harry A. Shields
By Luther V. Moulton
Attorney

H. A. SHIELDS.
MACHINE FOR FOLDING TUBULAR KNIT FABRICS.
APPLICATION FILED MAR. 23, 1908.

915,229.

Patented Mar. 16, 1909.
3 SHEETS—SHEET 3.

Witnesses
H. O. Van Antwerp.
Palmer A. Jones.

Inventor
Harry A. Shields
By Luther V. Moulton
Attorney

UNITED STATES PATENT OFFICE.

HARRY A. SHIELDS, OF NASHVILLE, MICHIGAN, ASSIGNOR TO S. C. F. MACHINERY COMPANY, OF NASHVILLE, MICHIGAN, A CORPORATION OF MICHIGAN.

MACHINE FOR FOLDING TUBULAR KNIT FABRICS.

No. 915,229.            Specification of Letters Patent.      Patented March 16, 1909.

Application filed March 23, 1908.  Serial No. 422,789.

*To all whom it may concern:*

Be it known that I, HARRY A. SHIELDS, a citizen of the United States of America, residing at Nashville, in the county of Barry and State of Michigan, have invented certain new and useful Improvements in Machines for Folding Tubular Knit Fabrics; and I do hereby declare the following to be a full, clear, and exact description of the invention, such as will enable others skilled in the art to which it appertains to make and use the same.

My invention relates to improvements in machines for folding tubular knit fabrics. It is customary in the manufacture of various knit goods to first knit a continuous tubular fabric, then fold the same in proper superposed layers for cutting, whereby the same may be readily cut with dies into proper pieces for producing the desired garments. Such knit fabrics are very elastic and unless evenly stretched when folded, the several portions after cutting will be uneven in size and distorted in shape.

Figure 1:
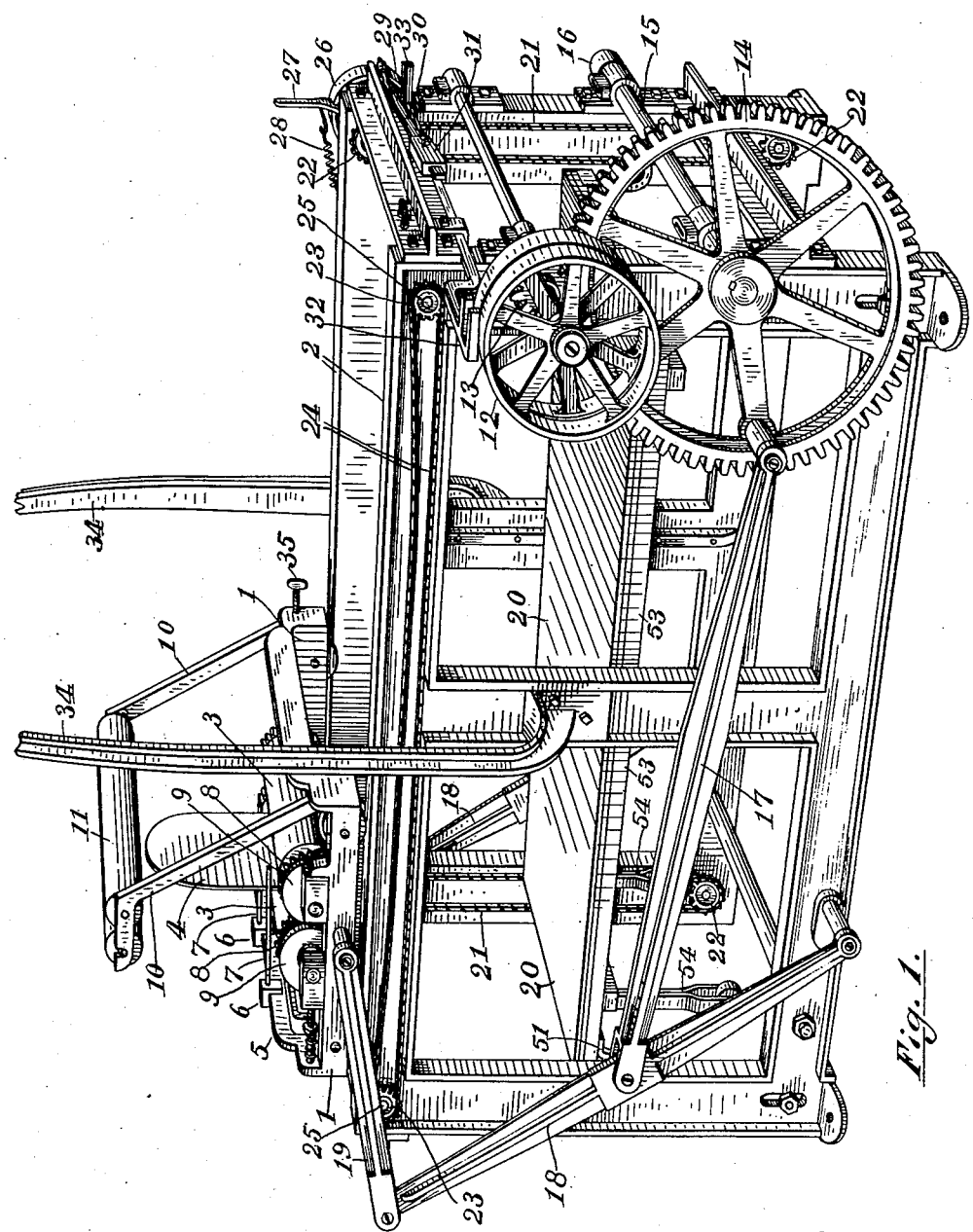
Figure 2:
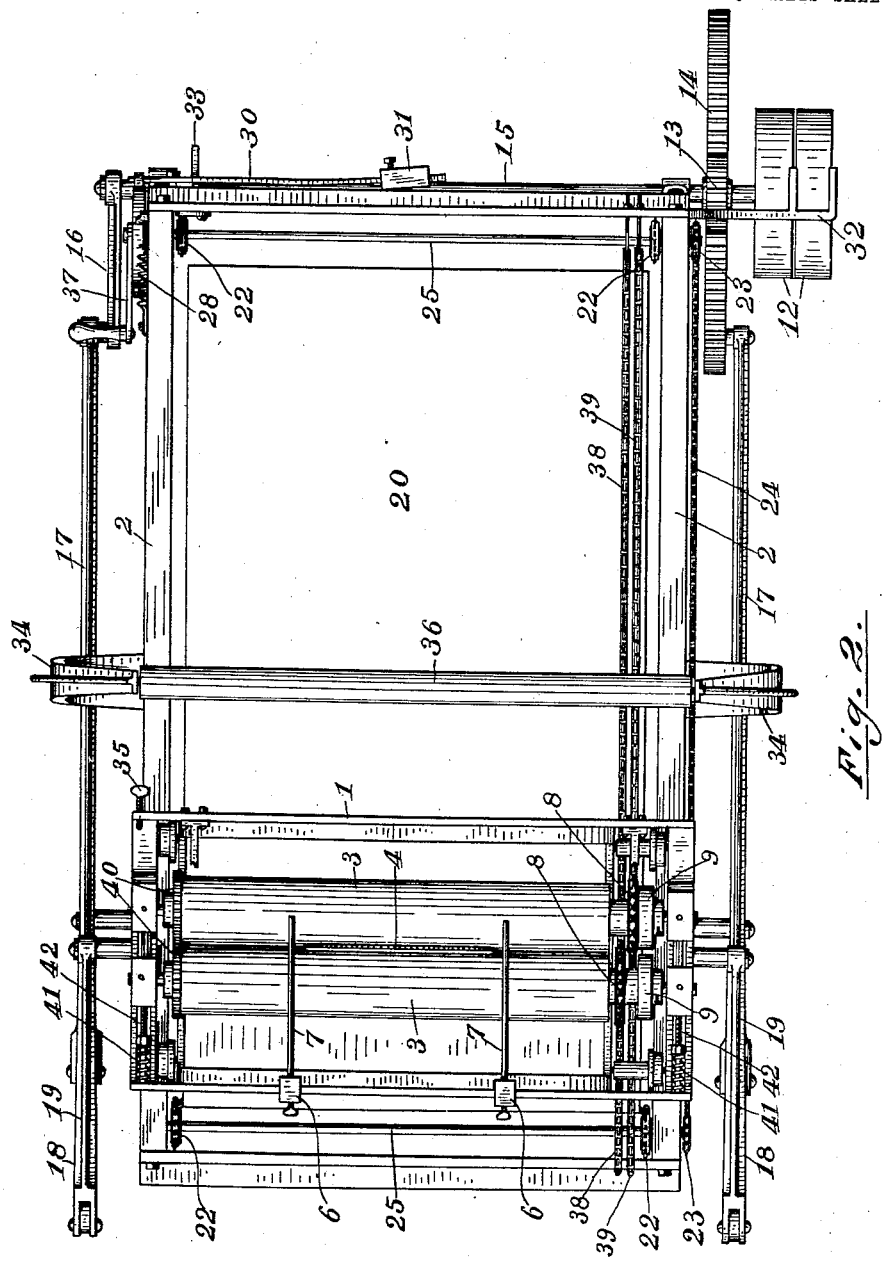
Figure 3:
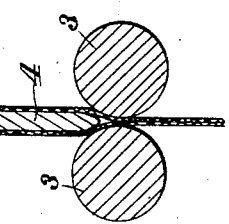
Figure 4:
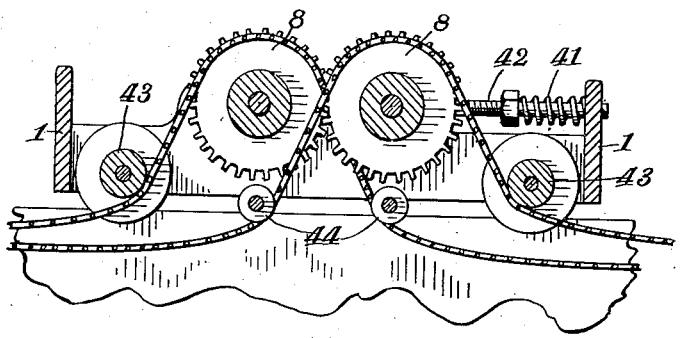
Figure 6:
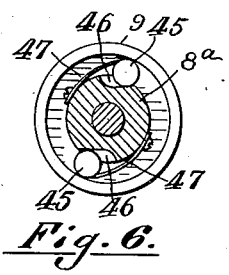
Figure 5:
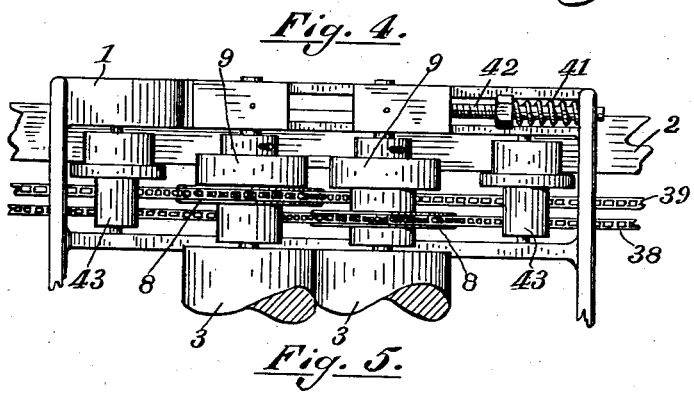
Figure 7:
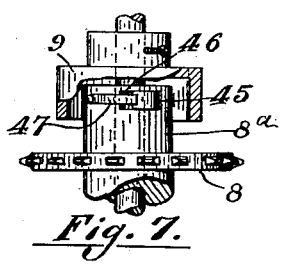
Figures 8, 9:
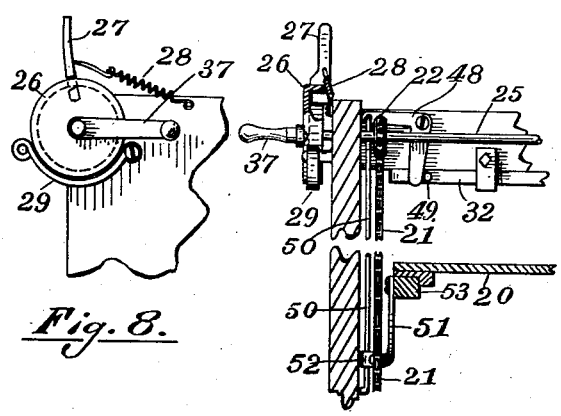
Figure 10:
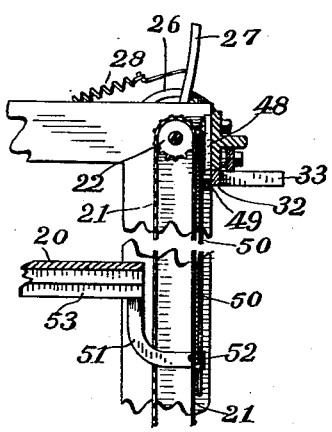

The object of my invention is to overcome this difficulty by providing the device with means for uniformly and evenly stretching the material, and for automatically folding the same in layers of uniform dimensions one above the other, and to provide the device with various new and useful features, as hereinafter more fully described and particularly pointed out in the claims, reference being had to the accompanying drawings, in which:

Figure 1. is a perspective of a machine embodying my invention with the upper roller removed; Fig. 2. is a plan view of the entire machine; Fig. 3. an enlarged detail of the carriage rollers and stretching board, shown in transverse section, together with a portion of the fabric; Fig. 4. an enlarged detail in side elevation of one end of the carriage with parts removed; Fig. 5. a plan view of one end of the carriage; Fig. 6. a detail of a clutch shown in elevation; Fig. 7. the same in plan view; Fig. 8. a detail of a portion of the mechanism for lowering the platform, shown in elevation; Fig. 9. the same at right angles to Fig. 8. with a portion of the platform and belt shifter; Fig. 10. the same as Fig. 9. shown at right angles to said figure.

Like numbers refer to like parts in all of the figures.

1 represents a reciprocating carriage adapted to traverse tracks 2 on the top of the frame of the machine. On this carriage and transverse to the direction of its movement are mounted a pair of rollers 3 between which the fabric is fed downward as the carriage reciprocates. Slidable within the tubular fabric is a stretcher board 4, preferably made of smooth and light wood which board slides freely within the fabric and is supported in vertical position thereby. This board by its relative width tensions the fabric laterally to an exact and uniform width, and by frictional contact with the fabric as the latter slides between the lower end of the board and the rollers 3 the fabric is longitudinally tensioned uniformly. The board being smooth and of light weight will not jam between the rollers but will slide on the interior of the fabric and be carried upward therein by the rollers. This board thus stretches the fabric uniformly as it moves within the same.

5 is a bar on one end of the carriage upon which bar are mounted adjustable blocks 6 carrying guide rods 7 extending at the respective sides of the stretcher board 4 to maintain the latter in proper position.

8 are sprocket wheels loosely journaled on the axis of the respective rollers 3, the hubs 8$^a$ of which wheels constitute inner clutch members surrounded by cup-shaped outer clutch members 9 fixed on the respective shafts of the rollers 3. Between these clutch members are roller dogs 45 movable in cam recesses 46 in the member 8$^a$ and retained in operative position by springs 47, these clutch members thus operating as ratchet clutches to alternately operate to rotate the rollers in the same direction. The rollers being geared together at the other end as at 40, each roller alternately drives the other as the carriage reciprocates. To operate these sprocket wheels, chains 38 and 39 respectively engage said wheels and extend beneath idlers 43 and 44 on the carriage and are secured at their ends to the ends of the frame whereby as the carriage reciprocates the sprocket wheels are both rotated in the same direction and reversed in their rotation at each reversal of the movement of the carriage. Each clutch is arranged to rotate the rollers downward at their adjacent sides, one clutch driving the rollers while the other clutch moves freely backward and each clutch operating alternately.

Above the stretching board 4 and supported by arms 10 mounted on the carriage, are a pair of rollers 11, which guide the fabric and maintain the same in vertical position where it incloses the stretcher board. To properly direct the fabric to these rollers, arms 34 extend upward at each side of the machine to a suitable distance above the same and a roller 36 is mounted upon the same over which roller the fabric is drawn from any suitable location. To insure the feeding of the fabric between the rollers 3 and to yieldingly grip the same, one of these rollers is mounted in movable bearings on the carriage which bearings are engaged and forced toward the bearing of the other roller by rods 42 longitudinally movable and operated by springs 41. The carriage is reciprocated preferably by means of connecting rods 19 operated by pivoted arms 18, which arms are in turn moved by other connecting rods 17 one of which is operated by a crank 16 and the other by a crank pin in a gear wheel 14 mounted on a shaft 15, the gear wheel serving as one crank and also drives the shaft 15 and is driven by a pinion 13 mounted on a shaft having a tight and loose pulley 12 engaged by a driving belt (not shown). 32 represents a belt shifter to engage and shift the belt on these pulleys to stop and start the machine. This shifter is provided with a handle 33 to manually operate the same, and is also operated to stop the machine when the platform reaches the lower limit as hereafter described.

Located beneath the carriage is a platform 20 which is automatically lowered step by step as the material is accumulated thereon. This platform is mounted upon ways 53 attached at their respective ends to vertically extended sprocket chains 21, which chains pass around sprocket wheels 22 at the top and bottom of the frame and extend near the respective corners of the platform. These ways are connected to the chains by brackets 51 and the platform is slidable on said ways so that when filled, it may be run out from beneath the carriage and outside the frame for removal of the material thereon. To support the outer end of this platform when so moved outward, it is provided with legs 54 having rollers to engage the floor. The upper sprocket wheels 22 which support these chains 21 are connected in pairs by shafts 25 at the respective ends of the machine, these shafts being connected by sprocket wheels 23 and a chain 24 to cause them to rotate simultaneously. The platform is lowered step by step and held by means of a wheel 26 on one of the shafts 25 and having an overhanging rim engaged by a friction pawl 27, which at each stroke of the carriage is engaged by an adjustable projection 35 on the carriage to turn the shafts 25 and thus lower the platform, the wheel being held in the interval by a friction brake 29 engaging the wheel 26 and operated by a lever 30 and weight 31. The pawl 27 is retracted at each stroke by means of a spring 28. To stop the machine when the platform has reached the lower limit, one of the brackets 51 terminates in an eye 52 slidable on a vertical rod 50, said rod being attached at its upper end to a bell crank 42 engaging a pin 49 in the belt shifter 32. When this eye 52 reaches a stop on the lower end of the rod it pulls the rod downward, and thus moves the bell crank and slides the belt shifter, throwing the belt on to the loose pulley and stopping the machine. A crank 37 is also provided on one of the shafts 25 whereby by manually raising the lever 30 and releasing the brake 29 the shafts 25 can be manually rotated to raise the platform 20 to starting position.

In operation, as the carriage is reciprocated on the tracks 2, the rollers 3 are rotated downward at their adjacent sides at each stroke of the carriage at the same speed that the carriage travels, thus feeding the material evenly to and fro upon the platform 20. At each stroke the platform is lowered sufficient to accommodate the increasing amount of stock thereon. The board 4 spreads and stretches the fabric uniformly, laying the same at a uniform tension both longitudinally and transversely, whereby when cut, each superposed piece will be of the same size and shape.

When the platform reaches the lower limit, the machine stops automatically and the platform can be run out from beneath the carriage and the material thereon removed. The platform is then replaced and restored to operative position and the operation of the machine repeated. By adjusting the projection 35 on the carriage the downward movement of the platform can be adjusted to conform to the increasing quantity of material thereon.

What I claim is:

1. In a folding machine for tubular fabrics, a reciprocating carriage, a pair of rollers mounted on the carriage, a stretcher-board supported by the rollers and adapted to traverse the interior of the tubular fabric and means for reciprocating the carriage.

2. In a folding machine for tubular fabrics a reciprocating carriage, a pair of rollers mounted on the carriage, means for rotating the rollers downward at their adjacent sides when the carriage reciprocates, a second pair of rollers above the first named rollers and spaced apart therefrom, and a stretcher-board between the respective pairs of rollers and adapted to traverse the interior of the tubular fabric.

3. In a folding machine for tubular fabrics a reciprocating carriage, means for operating the same, a receiving platform below the carriage, means for automatically lowering the platform, a pair of rollers mounted on the carriage, means for rotating the rollers downward at their adjacent sides, a stretcher-board supported upon the rollers, and a second pair of rollers above the stretcher board and journaled in arms fixed on the carriage.

4. In a folding machine for tubular fabrics, a reciprocating carriage, a receiving platform below the carriage, means for operating the carriage, a pair of rollers mounted on the carriage, means for rotating the rollers downward at their adjacent sides during the movement of the carriage and at the same speed thereof, a platform below the carriage, vertically disposed chains supporting the platform, a shaft near each end of the platform and supporting the chains, means for simultaneously rotating said shafts, a wheel on one of said shafts, a friction pawl and a friction brake engaging said wheel, an adjustable stop on the carriage engaging the pawl, and a retracting spring attached to the pawl.

5. In a folding machine for tubular fabrics, a reciprocating carriage, a pair of rollers mounted on the carriage, a sprocket wheel journaled on the axle of each roller, sprocket chains engaging said wheels and fixed at their respective ends, ratchet clutches connecting the respective wheels with the respective rollers and alternately operative, and gears connecting the rollers.

6. In a folding machine for tubular fabrics, a reciprocating carriage, a pair of rollers mounted on said carriage and geared to each other, means for rotating said rollers downward at their adjacent sides at each movement of the carriage and at the same speed, a stretcher-board supported by said rollers, a second pair of rollers above the stretcher-board and journaled in arms attached to the carriage, a roller support above the machine to guide the fabric to the upper rollers of the carriage, and a vertically adjustable platform below the carriage.

7. In a folding machine for tubular fabrics, a reciprocating carriage, a pair of rollers mounted on the carriage, means for rotating the rollers downward at their adjacent side as the carriage reciprocates and at the same speed, a stretcher-board arranged above said rollers and vertically supported thereby, a bar on the carriage, guide rods supported by the bar and embracing the stretcher-board, an upper pair of rollers above the stretcher-board and arms attached to the carriage and supporting said upper rollers.

8. In a folding machine for tubular fabrics, a reciprocating carriage, a pair of rollers mounted on the carriage, one of said rollers being mounted in movable bearings, springs to move said bearings toward the bearings of the other roller, means for rotating said rollers downward at each movement of the carriage and at the same speed, a stretcher-board arranged vertically and supported by said rollers, guide rods at the respective sides of said stretcher board and attached to the carriage, and a second pair of rollers above the stretcher-board and journaled in arms carried upon the carriage.

9. In a folding machine for tubular fabrics, a reciprocating carriage, a pair of rollers mounted on said carriage, a sprocket wheel loosely journaled on the axis of each roller and having a hub with a cam recess therein, cup-shaped clutch members surrounding each hub and fixed on the shaft of the respective roller, a roller pawl in the recess of each hub and engaging the respective clutch member, a spring engaging each roller pawl and attached to the respective hub, sprocket chains engaging the sprocket wheels and fixed at their respective ends.

10. In a folding machine for tubular fabrics, a reciprocating carriage, means for reciprocating the same, rollers mounted on said carriage, means for rotating the rollers downward as the carriage moves, a platform beneath the carriage, ways movably supporting said platform, vertically disposed chains supporting said ways, a transverse shaft near each end of the platform and supporting the chains, sprocket wheels and a chain connecting said shafts, a wheel on one of said shafts, a friction pawl engaging the rim of said wheel, a retracting spring attached to the pawl, an adjustable stop on the carriage engaging the pawl, a brake band engaging said wheel, and a lever and weight to operate said band.

11. In a folding machine for tubular fabrics, a reciprocating carriage, means for stretching and feeding a fabric downward carried by said carriage, a platform beneath said carriage, means for vertically adjusting the platform operated by said carriage, a driving pulley and a loose pulley to operate the carriage mechanism, a belt shifter near said pulleys, a lever to operate the shifter, a rod attached to the lever, and means for connecting the rod to the platform whereby the belt is shifted by the downward movement of the platform.

12. In a folding machine for tubular fabrics, a reciprocating carriage, ways beneath the carriage, means for raising and lowering said ways operated by the carriage, a platform slidable on said ways and legs beneath the platform and adapted to support one end of the same when drawn off the ways.

In testimony whereof I affix my signature in presence of two witnesses.

HARRY A. SHIELDS.

Witnesses:
GEORGIANA CHACE,
LUTHER V. MOULTON.